United States Patent
Liu

(10) Patent No.: US 12,039,752 B2
(45) Date of Patent: Jul. 16, 2024

(54) METHOD FOR DETERMINING LINE-OF-SIGHT, METHOD FOR PROCESSING VIDEO, DEVICE, AND STORAGE MEDIUM

(71) Applicant: BIGO TECHNOLOGY PTE. LTD., Singapore (SG)

(72) Inventor: Gengdai Liu, Guangzhou (CN)

(73) Assignee: BIGO TECHNOLOGY PTE. LTD., Singapore (SG)

( * ) Notice: Subject to any disclaimer, the term of this patent is extended or adjusted under 35 U.S.C. 154(b) by 376 days.

(21) Appl. No.: 17/626,096

(22) PCT Filed: Jun. 22, 2020

(86) PCT No.: PCT/CN2020/097318
§ 371 (c)(1),
(2) Date: Jan. 10, 2022

(87) PCT Pub. No.: WO2021/004257
PCT Pub. Date: Jan. 14, 2021

(65) Prior Publication Data
US 2022/0254058 A1    Aug. 11, 2022

(30) Foreign Application Priority Data
Jul. 10, 2019    (CN) .......................... 201910620700.3

(51) Int. Cl.
*G06K 9/00*    (2022.01)
*G06T 7/73*    (2017.01)

(52) U.S. Cl.
CPC ...... *G06T 7/73* (2017.01); *G06T 2207/10016* (2013.01); *G06T 2207/20084* (2013.01); *G06T 2207/30201* (2013.01)

(58) Field of Classification Search
CPC .......... G06F 3/013; G06F 3/012; G06F 3/011; G06F 3/017; G06F 3/04815;
(Continued)

(56) References Cited

U.S. PATENT DOCUMENTS 7,862,172 B2    1/2011  Yoshinaga et al.
10,878,237 B2   12/2020 Rougeaux et al.
(Continued)

FOREIGN PATENT DOCUMENTS

CN    101069214 A    11/2007
CN    101419664 A     4/2009
(Continued)

OTHER PUBLICATIONS

Wan, Z.; Wang, X.; Zhou, K.; Chen, X.; Wang, X. A Novel Method for Estimating Free Space 3D Point-of-Regard Using Pupillary Reflex and Line-of-Sight Convergence Points. Sensors 2018, 18, 2292. (Year: 2018).*

Passive Driver Gaze Tracking with Active Appearance Models, T. Ishikawa, S. Baker, I. Matthews, and T. Kanade, Proceedings of the 11th World Congress on Intelligent Transportation Systems, Oct. 2004 (Year: 2004).*

(Continued)

*Primary Examiner* — Alex Kok S Liew
(74) *Attorney, Agent, or Firm* — Kolitch Romano Dascenzo Gates LLC

(57) ABSTRACT

Provided is a method for detecting line-of-sight. The method for detecting line-of-sight includes: determining, based on a key feature point in a face image, a face posture and an eye pupil rotational displacement corresponding to the face image, wherein the eye pupil rotational displacement is a displacement of a pupil center relative to an eyeball center in the face image; and acquiring a line-of-sight direction of an actual face by back-projecting, based on a preset projection function and the face posture, the eye pupil rotational displacement to a three-dimensional space where the actual face is located.

17 Claims, 6 Drawing Sheets

(58) Field of Classification Search
CPC .... G06F 3/0346; G06F 1/163; G06F 3/04842; G06F 3/0482; G06F 3/01; G06F 3/014; G06F 3/0304; G06F 3/167; G06F 3/04845; G06F 3/0481; G06F 9/453; G06F 1/1686; G06F 3/016; G06F 3/038; G02B 27/0093; G02B 27/0172; G02B 27/017; G02B 2027/0138; G02B 2027/0187; G02B 2027/014; G02B 2027/0178; G02B 7/28; G02B 7/287; G02B 27/0101; G02B 27/0179; G02B 2027/0132

See application file for complete search history.

(56) References Cited

U.S. PATENT DOCUMENTS

| | | | |
|---|---|---|---|
| 11,061,470 | B2 | 7/2021 | Ninomiya |
| 11,129,530 | B2 | 9/2021 | Johansson et al. |
| 2006/0077558 | A1 | 4/2006 | Urakawa et al. |
| 2009/0304232 | A1 | 12/2009 | Tsukizawa |
| 2011/0249868 | A1* | 10/2011 | Tsukizawa ............ A61B 5/163 382/103 |
| 2015/0116206 | A1* | 4/2015 | Irie ...................... G06F 3/012 345/156 |

FOREIGN PATENT DOCUMENTS

| | | |
|---|---|---|
| CN | 101489467 A | 7/2009 |
| CN | 102662476 A | 9/2012 |
| CN | 102830793 A | 12/2012 |
| CN | 103207664 A | 7/2013 |
| CN | 103279969 A | 9/2013 |
| CN | 104951808 A | 9/2015 |
| CN | 108182377 A | 6/2018 |
| CN | 109087340 A | 12/2018 |
| CN | 109471523 A | 3/2019 |
| CN | 109690553 A | 4/2019 |
| CN | 109740491 A | 5/2019 |
| CN | 110363133 A | 10/2019 |
| IN | 102149325 A | 8/2011 |
| JP | 2014194617 A | 10/2014 |
| WO | 2013173531 A1 | 11/2013 |
| WO | 2015013022 A1 | 1/2015 |
| WO | 2015192879 A1 | 12/2015 |
| WO | 2016111880 A1 | 7/2016 |
| WO | 2019026330 A1 | 2/2019 |

OTHER PUBLICATIONS

Extended European Search Report Communication Pursuant to Rule 62 EPC, dated Jul. 12, 2022 in Patent Application No. EP 20836409.1, which is a foreign counterpart application to which this application claims priority.

Eivazi, Shaharam et al., "Improving Real-time CNN-based Pupil Detection Through Domain-Specific Data Augmentation", Proceedings of The Genetic and Evolutionary Computation Conference, ACMPUB27, New York, NY, USA, Jun. 25, 2019, pp. 1-6, DOI: 10.1145/3314111. 3319914, ISBN: 978-1-4503-6111-8, the whole document.

Wood, Erroll et al., "A 3D Morphable Eye Region Model for Gaze Estimation", Cornell University Library, 201 Olin Library Cornell University Ithaca, NY14853, pp. 297-313, Sep. 11, 2016, the whole document.

Zhang, Xucong et al., "Appearance-Based Gaze Estimation in the Wild", Cornell University Library, 201 Olin Library Cornell University Ithaca, NY14853, Apr. 11, 2015, DOI: 10 .1109/CVPR.2015. 7299081, the whole document.

International Search Report of the International Searching Authority for State Intellectual Property Office of the People's Republic of China in PCT application No. PCT/CN2020/097318 issued on Sep. 27, 2020, which is an International application corresponding to this U.S. application.

The State Intellectual Property Office of People's Republic of China, First Office Action in Patent Application No. CN201910620700.3 issued on Feb. 9, 2021, which is a foreign counterpart application corresponding to this U.S. Patent Application, to which this application claims priority.

Cao, Chen, et al.; "Real-time Facial Animation with Image-based Dynamic Avatars"; ACM Trans. Graph. 35, 4, Article 126; Jul. 2016.

Mohammadi, Mohammad Reza, et al.; "A Novel Technique for Pupil Center Localization Based on Projective Geometry"; IEEE, pp. 1-5, Dec. 31, 2011.

Thies, Justus, et al.; "FaceVR:Real-Time Gaze-Aware Facial Reenactment in Virtual Reality"; ACM Trans. Graph. 37, 2, Article 25; Jun. 2018.

Thies, Justus, et al.; "HeadOn: Real-time Reenactment of Human Portrait Videos"; ACM Trans. Graph. 37, 4, Article 164; Jul. 2018.

Wang, Wen-Cheng, et al.; "A Precise Eye Localization Method Based on Region Projection"; Journal of Optoelectronics-Laser, vol. 22 No. 4, Apr. 2011.

Zhang, Wen, et al.; "Gaze Estimation Based on Extracted Parameter of One Iris"; Journal of Optoelectronics-Laser, vol. 22 No. 6; Jun. 2011.

\* cited by examiner

METHOD FOR DETERMINING LINE-OF-SIGHT, METHOD FOR PROCESSING VIDEO, DEVICE, AND STORAGE MEDIUM

CROSS-REFERENCE TO RELATED APPLICATION

This application a U.S. national stage of international application No. PCT/CN2020/097318, filed on Jun. 22, 2020, which claims priority to Chinese Patent Application No. 201910620700.3, filed on Jul. 10, 2019, the disclosures of which are herein incorporated by reference in their entireties.

TECHNICAL FIELD

Embodiments of the present disclosure relate to the field of image processing, and for example, relates to a method for detecting line-of-sight, a method for processing a video, a device, and a storage medium.

BACKGROUND

With the development of video technologies, three-dimensional (3D) virtual characters have been widely applied in entertainment, movies, and virtual reality (VR) simulations. In this case, eyes are a very important part of the virtual characters. Freedom of natural rotation of the eyes is much less than that of facial expressions and body movements. However, perception of people to eye movements is very sensitive, and unnatural eyeball angles and movements are simply perceived. Eye movement capture devices that capture the center points of eyeballs and pupils are generally head-mounted, and are inconvenient to use.

For the above problems, in an application scenario of verisimilitudinous facial expression animation, transformation from the movement from a captured pupil center point to the eyeball movement is generally implemented by an eyeball texture synthesis solution, as illustrated the following references:
[1] Justus Thies, Michael Zollhöfer, Marc Stamminger, Christian Theobalt, and Matthias Nießner. 2018. FaceVR: Real-Time Gaze-Aware Facial Reenactment in Virtual Reality. ACM Trans. Graph. 37, 2, Article 25 (June 2018);
[2] Justus Thies, Michael Zollhöfer, Christian Theobalt, Marc Stamminger, and Matthias Niessner. 2018. Headon: real-time reenactment of human portrait videos. ACM Trans. Graph. 37, 4, Article 164 (July 2018);
[3] Chen Cao, Hongzhi Wu, Yanlin Weng, Tianjia Shao, and Kun Zhou. 2016. Real-time facial animation with image-based dynamic avatars. ACM Trans. Graph. 35, 4, Article 126 (July 2016), 12 pages;
[4] System and method for tracking facial muscle and eye movements for manufacturing computer graphics animation, CN101069214A; and
[5] Method for establishing three-dimensional virtual eye movement model rich in emotion expressions, CN103279969A.

Reference [1] and Reference [2] are methods similar to data driving, and Reference [3] employs a simpler and more intuitive bulletin board method, all of which select the eyeball texture best matched with a current eyeball state from a large number of eyeball textures, and places the same on a target eyeball to achieve migration of the eyeball movement, The comparison with a large number of history eyeball textures is required, and the amount of data processing is larger, resulting in a lower judgment efficiency of line-of-sight. Reference [4] directly tracks the eye movement through the movement of eye muscles, and Reference [5] employees a rule-based method to directly synthesize various movement effects of changes of a line-of-sight direction, none of which directly analyzes the eye movement based on changes of a pupil position, resulting in a lower accuracy of the determined eyeball line-of-sight.

SUMMARY

Embodiments of the present disclosure provide a method for detecting line-of-sight, a method for processing a video, a device, and a storage medium.

The embodiments of the present disclosure provide a method for detecting line-of-sight. The method includes:
determining, based on a key feature point in a face image, a face posture and an eye pupil rotational displacement corresponding to the face image, wherein the eye pupil rotational displacement is a displacement of a pupil center relative to an eyeball center in the face image; and
acquiring a line-of-sight direction of an actual face by back-projecting, based on a preset projection function and the face posture, the eye pupil rotational displacement to a three-dimensional space where the actual face is located.

The embodiments of the present disclosure provide a method for processing videos. The method includes:
acquiring a video frame in a to-be-processed video; and
acquiring the line-of-sight direction of the actual face corresponding to the video frame by performing the method for detecting line-of-sight according to any one of the above embodiments.

The embodiments of the present disclosure provide a device. The device includes:
one or more processors; and
a memory configured to store one or more programs; wherein
the one or more programs, when run by the one or more processors, causes the one or more processors to implement the method for detecting the line-of-sight according to any one of the embodiments of the present disclosure, or implement the method for processing videos according to any one of the embodiments of the present disclosure.

The embodiments of the present disclosure provide a computer-readable storage medium storing a computer program, wherein the computer program, when run by a processor, causes the processor to perform the method for detecting the line-of-sight according to any one of the embodiments of the present disclosure, or perform the method for processing videos according to any one of the embodiments of the present disclosure.

DETAILED DESCRIPTION

The present disclosure is described hereinafter in combination with accompanying drawings and some embodiments. The embodiments described herein are merely used to explain the present disclosure, but not to limit the present disclosure. In addition, for ease of description, only part instead of all of the structures related to the present disclosure are shown in the accompanying drawings.

First Embodiment

Figure 1A:
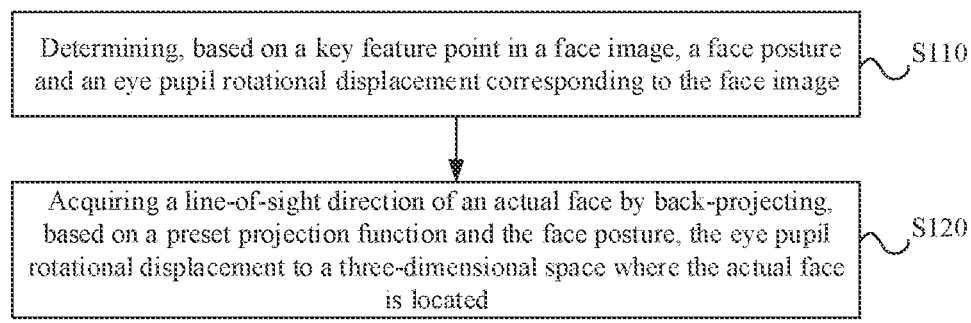
FIG. 1A is a flowchart of a method for detecting line-of-sight according to a first embodiment of the present disclosure.

FIG. 1A is a flowchart of a method for detecting line-of-sight according to a first embodiment of the present disclosure. This embodiment is applicable to any situation where the line-of-sight direction of a user is detected by capturing a face image. The method for detecting line-of-sight according to this embodiment may be performed by an apparatus for detecting line-of-sight according to the embodiment of the present disclosure. The apparatus may be implemented in a software and/or hardware fashion, and integrated in a device for performing the method. The device may be any three-dimensional model processing device with an image processing capability.

Referring to FIG. 1A, the method may include the following processes.

In S110, a face posture and an eye pupil rotational displacement corresponding to the face image are determined based on a key feature point in a face image.

In the display of a video screen containing facial expressions for entertainment applications or game websites, a corresponding three-dimensional face model should be reconstructed based on the face images of a plurality of different expressions. In this case, an actual line-of-sight direction of the user in the face image should be judged, so as to add a corresponding three-dimensional eyeball effect to the reconstructed three-dimensional face model based on the line-of-sight direction. Therefore, the eyeball can rotate naturally in the reconstructed three-dimensional face model. For improvement of automation of the device, in the case that a corresponding processing operation is directly performed on an object designated by the line-of-sight of the user, the actual line-of-sight direction of the user should also be detected based on the face image.

Figure 1B:
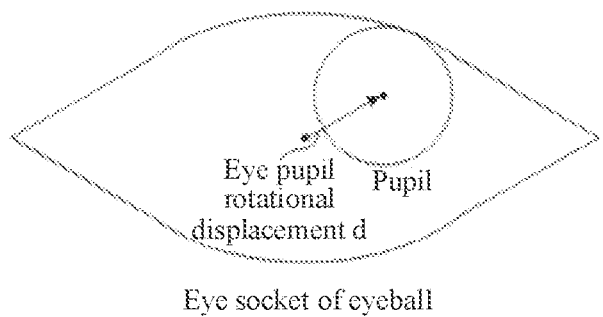
FIG. 1B is a schematic diagram of an eye pupil rotational displacement in a face image in a method for detecting line-of-sight according to the first embodiment of the present disclosure.

The feature point is a point in the face image that possesses distinct characteristics, can effectively reflect essential characteristics of the model, and can identify a target part in the image. In this embodiment, the feature point refers to a pixel point that can represent a plurality of facial features in the face image. The key feature point is a local feature point in the face image. Optionally, the key feature points are the feature points that may clearly present the positions of facial features such as eyes, a nose, a mouth and a chin in the face image or positions of eye sockets, nose wings and other facial details in all the feature points. In this case, the face posture refers to a corresponding head posture when the user looks at a camera or turns the head, such as an offset rotation angle of the head in the face image. The eye pupil rotational displacement is a displacement of a pupil center relative to an eyeball center in the face image, that is, an eyeball rotational displacement in the face image. As shown in FIG. 1B, in an eye area of the face image, the part filled by oblique lines is the eyeball pupil, and the eye pupil rotational displacement is the displacement d in FIG. 1B.

Optionally, in the case that the actual line-of-sight direction of the user in the face image in this embodiment is detected, the key feature points in the face image are firstly determined by image recognition, the posture positions of the facial features correspondingly represented by a plurality of key feature points are determined, and then the posture positions corresponding to the plurality of key feature points and the posture positions of a plurality of facial features in a normal face image are compared and analyzed to judge the rotation or offset information of the head in the face image. Thus, the face posture of the user in the face image is determined; in this case, an eye image determined by the key feature points in the face image is analyzed, and the corresponding eye pupil rotational displacement is determined based on the offset condition of the pupil center relative to the eyeball center in the eye image, so as to directly perform corresponding processing on the eye pupil rotational displacement to determine the line-of-sight direction of the actual face.

Exemplarily, where this embodiment is in a scenario where a corresponding three-dimensional eyeball model is added to the reconstructed three-dimensional face model, the corresponding three-dimensional face model must be reconstructed based on the face image. In order to decrease the amount of data processing, the key feature points in the face image may be acquired directly through the reconstructed three-dimensional face model in this embodiment. In this case, prior to determining the corresponding face posture and eye pupil rotational displacement based on the key feature points in the face image, this embodiment may further include: acquiring face data corresponding to the face image by scanning the face image; acquiring a reconstructed face grid model by reconstructing a preset three-dimensional face grid template with the face data; and extracting the key feature points in the reconstructed face grid model, and taking the extracted key feature points as the key feature points in the face image.

Figure 1C:
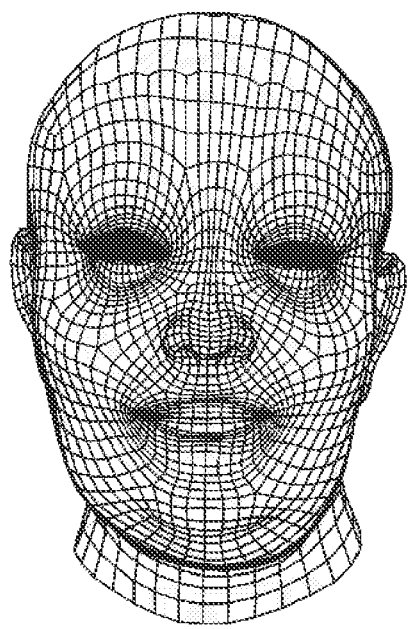
FIG. 1C is a schematic diagram of a reconstructed face grid model in a method for detecting line-of-sight according to the first embodiment of the present disclosure.

Firstly, the captured face image is scanned with a three-dimensional scanning technology to acquire the corresponding face data, and then posture matching positions of the feature points in the face data and the corresponding feature points in the preset three-dimensional face grid template are analyzed, such that the preset three-dimensional face grid template is continuously pulled to deform based on the posture matching positions of the feature points in the face data. Therefore, the positions of the plurality of feature points in the deformed three-dimensional face grid template are matched with the positions of the feature points in the face data in one to one correspondence, thereby acquiring the reconstructed face grid model, as shown in FIG. 1C. Then a plurality of corresponding key feature points are directly extracted from the reconstructed face grid model, and the plurality of key feature points are taken as the key feature points in the face image. In this case, the key feature points are grid vertices of the face grid model, which improves the extraction efficiency and accuracy of the key feature points.

In S120, the line-of-sight direction of the actual face is acquired by back-projecting, based on a preset projection function and the face posture, the eye pupil rotational displacement to a three-dimensional space where the actual face is located.

The projection function is a function used in the case that the face of the user in the three-dimensional space is projected onto a corresponding two-dimensional imaging surface in the process of capturing the face image to acquire a conversion basis of the face image, such that the actual face in the three-dimensional space and the face image on the two-dimensional imaging surface are subject to a mapping relationship; and the eye pupil rotational displacement in the two-dimensional imaging surface corresponds to the line-of-sight direction of the actual face in the three-dimensional space.

Figure 1D:
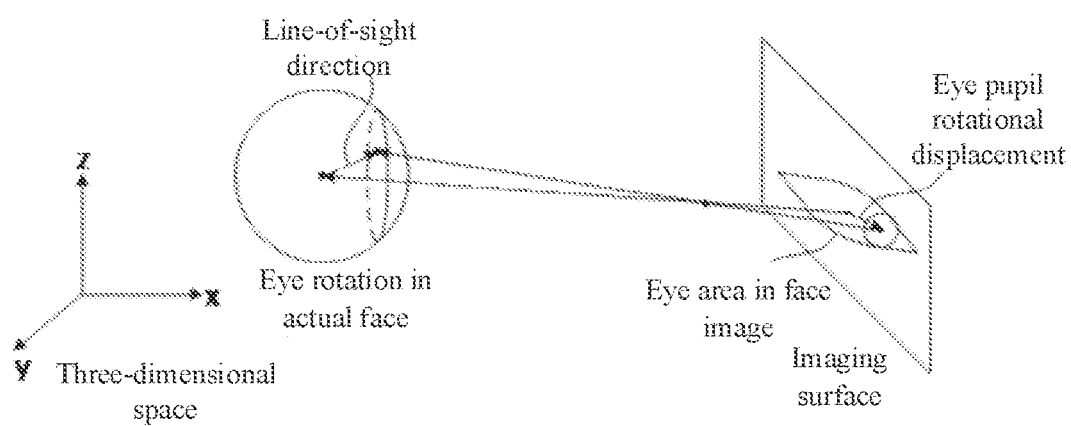
FIG. 1D is a schematic diagram of a principle of a line-of-sight detection process according to the first embodiment of the present disclosure.

The offset of the face posture in the face image indicates that the actual face in the three-dimensional space is rotated, and the line-of-sight direction is accordingly rotated. Therefore, in this embodiment, in the case that the face posture and the eye pupil rotational displacement in the face image are acquired, as shown in FIG. 1D, a plurality of parameters in the preset projection function may be adjusted based on the face posture, and then the eye pupil rotational displacement is back-projected into the three-dimensional space where the actual face is located by the adjusted projection function. In this way, the line-of-sight direction of the actual face is acquired based on the displacement of the eye pupil rotational displacement back-projected to the three-dimensional space, such that the corresponding operation is performed subsequently based on the line-of-sight direction.

In addition, a capture device is provided with different projection functions under different shooting parameters, and thus, prior to acquiring the line-of-sight direction of the actual face by back-projecting the eye pupil rotational displacement to the three-dimensional face where the actual face is located based on the preset projection function and the face posture, the method according to this embodiment may further include: determining the preset projection function based on a parameter of the capture device corresponding to the face image.

The parameter of the capture device in this embodiment may be an imaging focal length of the capture device; and the capture device is provided with different projection functions under different imaging focal lengths, such that the size of the image containing the same object varies with different imaging focal lengths. Optionally, in this embodiment, based on the parameter of the capture device for capturing the face image by the capture device, the corresponding projection function may be determined as the preset projection function in this embodiment, such that the accuracy of back-projecting the eye pupil rotational displacement in the face image into the three-dimensional space where the actual human face is located is improved.

In the technical solution according to this embodiment, the face posture corresponding to the face image and the eye pupil rotational displacement of the pupil center relative to the eyeball center in the face image are determined based on the key feature point in the face image, and then the eye pupil rotational displacement is back-projected, based on the preset projection function and the face posture, into the three-dimensional space where the actual face is located, thereby acquiring the line-of-sight direction of the actual face. In this solution, it is unnecessary to compare the eye texture in the face image with the eye textures in a large number of history face images, or judge a rotational direction of the eyeball based on the movement of other features than the eyeball in the face image, which reduces the processing amount of eye data and improves the detection efficiency of the line-of-sight direction. The line-of-sight direction of the actual face is directly analyzed based on eye pupil rotation in the face image, which improves the detection accuracy of the line-of-sight direction.

Second Embodiment

Figure 2A:
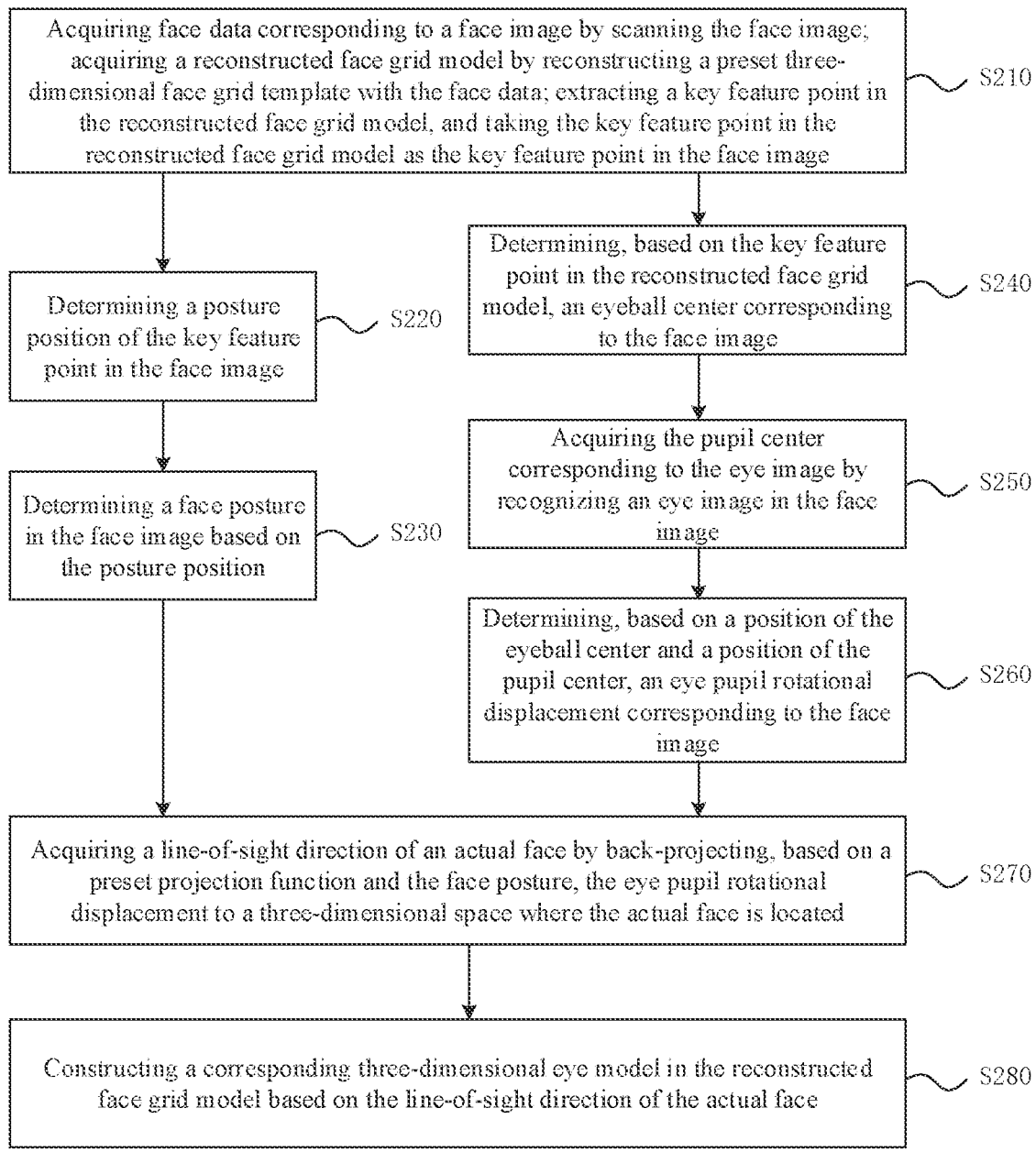
FIG. 2A is a flowchart of a method for detecting line-of-sight according to a second embodiment of the present disclosure.
Figure 2B:
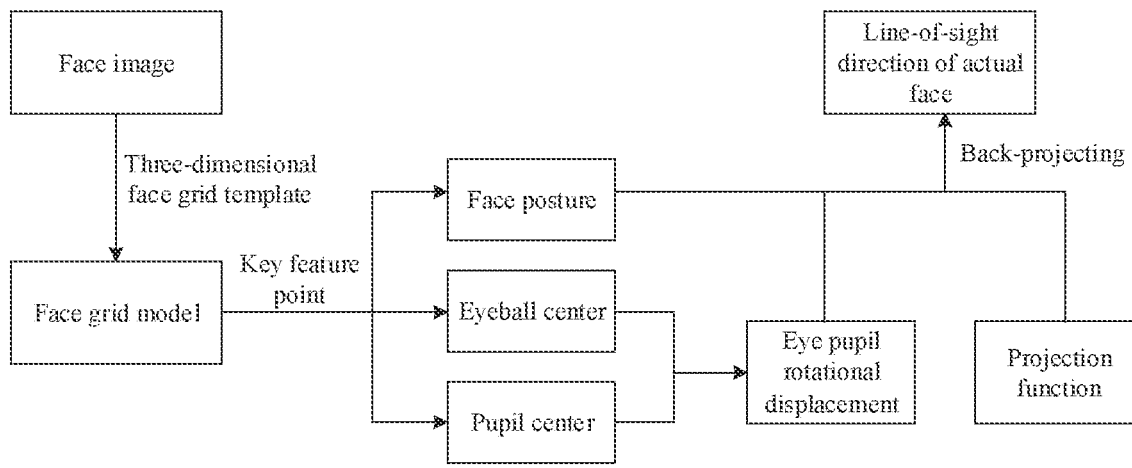
FIG. 2B is a schematic diagram of a principle of a line-of-sight detection process according to the second embodiment of the present disclosure.

FIG. 2A is a flowchart of a method for detecting line-of-sight according to a second embodiment of the present disclosure, and FIG. 2B is a schematic diagram of a principle of a line-of-sight detection process according to the second embodiment of the present disclosure. This embodiment is illustrated based on the above embodiment. In this embodiment, the process of determining the face posture and the eye pupil rotational displacement in the face image is mainly illustrated.

Optionally, referring to FIG. 2A, the method according to this embodiment may include the following processes.

In S210, the face data corresponding to the face image is acquired by scanning the face image; the reconstructed face grid model is acquired by reconstructing the preset three-dimensional face grid template with the face data; and the key feature point in the reconstructed face grid model is extracted, and the key feature point in the reconstructed face grid model is taken as the key feature point in the face image.

In S220, the posture position of the key feature point in the face image is determined.

Optionally, the posture positions indicate the positions of facial features in the face image with different expressions. In the case that the key feature points in the face image are acquired, a plurality of key feature points may be analyzed to judge the posture positions of the facial features corresponding to the key feature points in the face image.

In S230, the face posture in the face image is determined based on the posture position.

By comparing the posture positions of a plurality of key feature points in the face image with the posture positions of the corresponding key feature points in a conventional expressionless face image template, the offset of the plurality of key feature points is judged, and then the information such as a rotation angle and a translation distance of the face image is determined to acquire the face posture in the face image.

In S240, the eyeball center corresponding to the face image is determined based on the key feature point in the reconstructed face grid model.

Optionally, in the case that the reconstructed face grid model is acquired by reconstructing the preset face grid model with the face data, the face grid model has the same size as that of the face image. In this case, the key feature points in the face grid model may be determined, and the position and size of the eye socket in the face grid model are analyzed based on the plurality of key feature points. The position and size of the eye socket are the same as the position and size of the eye socket in the face image, and the size center point of the eye socket is taken as the corresponding eyeball center.

In S250, the pupil center corresponding to the eye image is acquired by recognizing the eye image in the face image.

Optionally, based on the position of the eye socket in the reconstructed face grid model, the corresponding position of the eye image may be determined in the face image. In this case, the eye image is recognized by an image recognition technology, and the position of the pupil in the eye image is determined. As the pupil is in a circular shape, a circle center of the pupil is taken as the pupil center corresponding to the eye image.

Exemplarily, for accuracy of the pupil center, as shown in FIG. 2B, in this embodiment, acquiring the pupil center corresponding to the eye image by recognizing the eye image in the face image may include: capturing the eye image in the face image; and acquiring the pupil center corresponding to the eye image by inputting the eye image into a pre-constructed deep network model.

The deep network model is a neural network model that is pre-trained based on a large number of history eye images and is capable of accurately recognizing the pupil center in the eye image; in this embodiment, the corresponding eye image may be captured from the face image based on the position of the eye socket in the reconstructed face grid model. The captured eye image is input into the pre-constructed deep network model, and the eye image is analyzed based on pre-trained network parameters in the deep network model, thereby acquiring the corresponding pupil center in the eye image.

In S260, the eye pupil rotational displacement corresponding to the face image is determined based on a position of the eyeball center and a position of the pupil center.

Upon determination of the eyeball center and the pupil center in the eye image, by making a difference value between the position of the eyeball center and the position of the pupil center, an offset of the pupil center relative to the eyeball center is determined, and the corresponding eye pupil rotational displacement is acquired.

In this embodiment, the process of determining the face posture and the eye pupil rotational displacement may be simultaneously performed, and there is no specific sequence. That is, S220 and S230 are taken as an integral process, and S240, S250 and S260 are taken as an integral process. The processes corresponding to S220 and S230 and the processes corresponding to S240, S250, and S260 may be simultaneously performed, which is not limited in this embodiment.

In S270, the line-of-sight direction of the actual face is acquired by back-projecting, based on the preset projection function and the face posture, the eye pupil rotational displacement to the three-dimensional space where the actual face is located.

In S280, a corresponding three-dimensional eye model is constructed in the reconstructed face grid model based on the line-of-sight direction of the actual face.

Optionally, where this embodiment is in a scenario where a corresponding three-dimensional eyeball model is added to the reconstructed three-dimensional face model, in the case that the line-of-sight direction of the actual face is acquired, a three-dimensional eyeball model corresponding to a line-of-sight display effect of the eyeball is set, based on the line-of-sight direction of the actual face, in the reconstructed three-dimensional face grid model, that is, an eye socket area in the face grid model in this embodiment, so as to ensure the natural and smooth rotation of the three-dimensional eyeball model in the reconstructed face grid model. Furthermore, eyeball animation in the reconstructed face grid model is driven to synthesize special effects, and the virtual rotation effect of eyeball animation is improved.

In the technical solution according to this embodiment, the face posture in the face image is determined based on the posture position of the key feature point, and in this case, the corresponding eye pupil rotational displacement is determined based on the position of the eyeball center and the position of the pupil center in the face image, thereby ensuring the accuracy of the face posture and the eye pupil rotational displacement. Furthermore, the line-of-sight direction of the actual face is acquired by back-projecting, based on the preset projection function and the face posture, the eye pupil rotation to the three-dimensional space where the actual face is located, which improves the detection efficiency and accuracy of the line-of-sight direction. In this case, the corresponding three-dimensional eyeball model is constructed in the reconstructed face grid model based on the line-of-sight direction of the actual face, thereby achieving the natural and smooth rotation of the eyeball in the reconstructed face grid model, and improving the virtual rotation effect of the eyeball animation in the reconstructed face grid model.

Third Embodiment

Figure 3A:
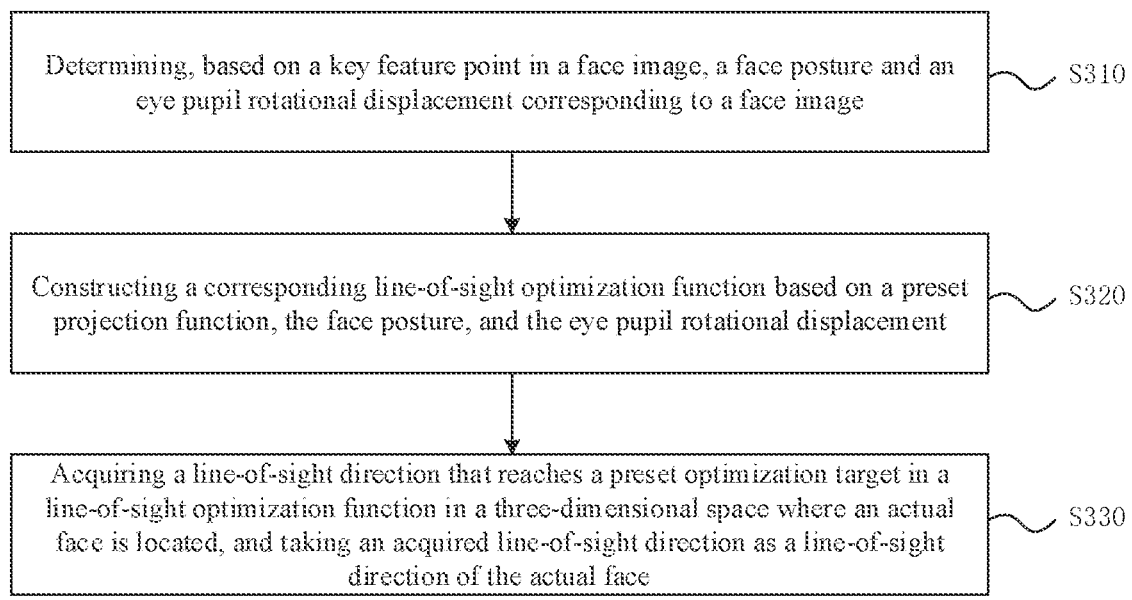
FIG. 3A is a flowchart of a method for detecting line-of-sight according to a third embodiment of the present disclosure.
Figure 3B:
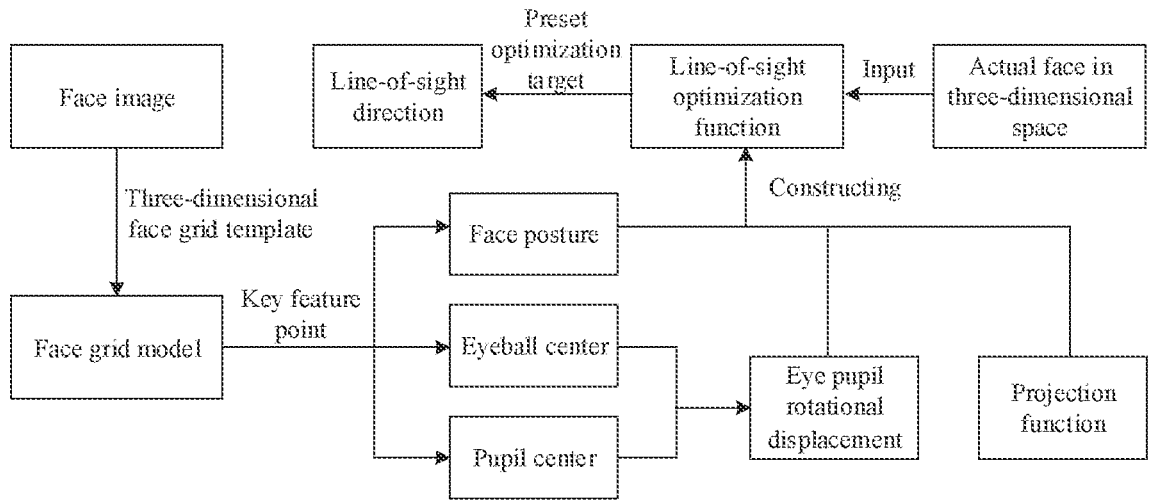
FIG. 3B is a schematic diagram of a principle of a line-of-sight detection process according to the third embodiment of the present disclosure.

FIG. 3A is a flowchart of a method for detecting line-of-sight according to a third embodiment of the present disclosure, and FIG. 3B is a schematic diagram of a principle of a line-of-sight detection process according to the third embodiment of the present disclosure. This embodiment illustrates based on the above embodiments. In this embodiment, the process of back-projecting the eye pupil rotational displacement in the face image to the line-of-sight direction of the actual face in the three-dimensional space is mainly illustrated.

Optionally, referring to FIG. 3A, the method according to this embodiment may include the following processes.

In S310, the face posture and the eye pupil rotational displacement corresponding to the face image are determined based on the key feature point in the face image.

In S320, a corresponding line-of-sight optimization function is constructed based on the preset projection function, the face posture, and the eye pupil rotational displacement.

Optionally, in this embodiment, by searching for the corresponding preset projection function, the projection function projects the actual face onto the corresponding two-dimensional imaging surface under the influence of the face posture to generate the corresponding face image. In the case that the line-of-sight direction of the actual face is projected onto the two-dimensional imaging surface, to overlap the line-of-sight direction of the actual face with the eye pupil rotational displacement as much as possible, the corresponding line-of-sight optimization function is constructed based on a corresponding projection relationship between the line-of-sight direction of the actual face and the eye pupil rotational displacement in the preset projection function and the face posture. Optimization of the line-of-sight optimization function is to ensure that a difference between the position where the line-of-sight direction of the actual face is projected onto the two-dimensional imaging surface and the eye pupil rotational displacement is the minimum.

In S330, a line-of-sight direction that reaches the preset optimization target in the line-of-sight optimization function in the three-dimensional space where the actual face is located is acquired, and the acquired line-of-sight direction is taken as the line-of-sight direction of the actual face.

Optionally, the line-of-sight optimization function constructed in this embodiment is capable of accurately detecting the difference between the eye pupil rotational displacement in a projection image acquired by projecting a large number of faces in the three-dimensional space onto the two-dimensional imaging surface and the eye pupil rotational displacement in the captured face image in this embodiment. As the preset optimization of the line-of-sight optimization function is to ensure that the difference between the position where the line-of-sight direction of the actual face is projected onto the two-dimensional imaging surface and the eye pupil rotational displacement is the minimum, the projection image with the minimum difference is selected in this embodiment, and the line-of-sight direction of the projection image corresponding to the face in the three-dimensional space is determined, so as to acquire the line-of-sight direction of the actual face in this embodiment.

Exemplarily, for improvement of the detection accuracy of the line-of-sight, prior to acquiring the line-of-sight direction that reaches the preset optimization target in the line-of-sight optimization function in the three-dimensional space where the actual face is located as the line-of-sight direction of the actual face, the method according to this embodiment may further include: acquiring an associated image of the face image; and updating, based on a line-of-sight direction of the associated image, a preset associated smoothing parameter, and a preset anti-shake parameter, the line-of-sight optimization function.

The associated image carries the line-of-sight direction corresponding to the associated image; wherein the line-of-sight directions of the face in the frames of a pre-recorded video need to be detected in this embodiment, and the associated image of the face image is the previous video frame of the video frame corresponding to the face image in the video. As the line-of-sight direction of the face in each frame of the video is sequentially detected, the line-of-sight direction of the previous video frame is determined in in response to detecting the line-of-sight direction of the current video frame. In this embodiment, in order to ensure rotation smoothness of the eyeball when a plurality of video frames in the video are sequentially displayed, it is necessary to ensure that the difference between the line-of-sight directions in adjacent video frames is the minimum, so as to reduce irregular saccades of the eyeball in the face image as much as possible in the process of the sequence display of the video frames. In this case, the corresponding line-of-sight optimization function may be updated based on the line-of-sight direction of the associated image, the preset associated smoothing parameter, and the preset anti-shake parameter, such that the line-of-sight direction that reaches the preset optimization target in the updated line-of-sight optimization function in the three-dimensional space where the actual face is located is acquired, and is taken as the line-of-sight direction of the actual face.

Exemplarily, the updated line-of-sight optimization function is: $\min\{\|\Pi(Rx+t)-d\|^2+\alpha\|x-x_0\|^2+\beta\|x\|^2\}$.

In the above function, $\Pi(Rx+t)$ represents the preset projection function, R represents a rotation parameter in the face posture, t represents a translation parameter in the face posture, x represents the line-of-sight direction of the face image, d represents the eye pupil rotational displacement, $x_0$ represents the line-of-sight direction of the associated image, α represents the preset associated smoothing parameter, and β represents the preset anti-shake parameter. $\Pi(Rx+t)$ may be sPRx+t, wherein s represents a scaling factor, and $$P = \begin{bmatrix} 1 & 0 & 0 \\ 0 & 1 & 0 \end{bmatrix}.$$

In this case, $\|\Pi(Rx+t)-d\|^2$ represents the difference between the actual face projected onto the two-dimensional imaging surface and the eye pupil rotational displacement in the face image, $\alpha\|x-x_0\|^2$ represents the difference between the line-of-sight directions of the actual face and the associated image, $\beta\|x\|^2$ represents a shake degree of the line-of-sight direction of the actual face, and is configured to limit the movement of the eyeball to prevent the acquired line-of-sight direction from being inconsistent with the line-of-sight direction of the actual face. In this embodiment, in order to ensure the naturalness and smoothness of the eyeball rotation, the preset optimization target may be updated to the minimum sum of three items in the line-of-sight optimization function. In this case, based on the updated line-of-sight optimization function, the line-of-sight direction reaching the preset optimization target can be acquired in the three-dimensional space where the actual face is located, and is taken as the line-of-sight direction of the actual face.

In the technical solution according to this embodiment, the corresponding line-of-sight optimization function is constructed based on the preset projection function, face posture, and eye pupil rotational displacement. The preset optimization target in the line-of-sight optimization function ensures that the difference between the projection image of projecting the actual face onto the two-dimensional imaging surface based on the projection function and the face image is the minimum. In this case, the line-of-sight direction that reaches the line-of-sight optimization target in the three-dimensional space where the actual face is located is acquired, and is taken as the line-of-sight direction of the actual face. Therefore, the detection accuracy of the line-of-sight direction is improved, and the rotation naturalness and smoothness of the eyeball under a plurality of line-of-sight directions in different images is ensured.

Fourth Embodiment

Figure 4:
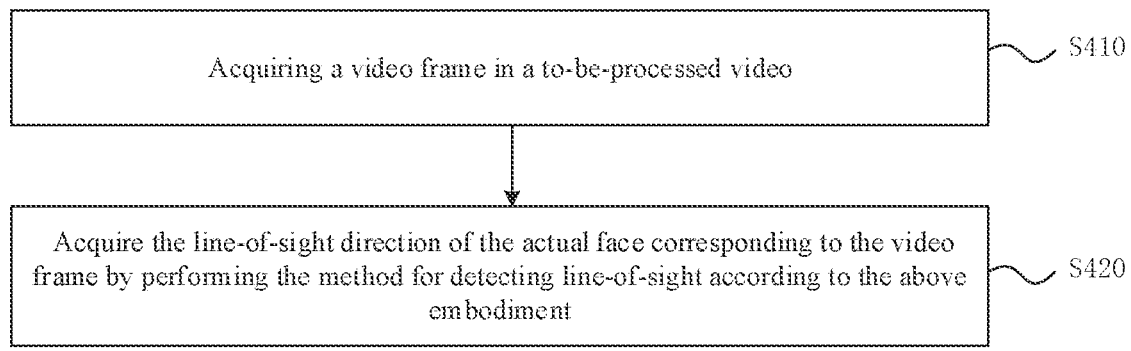
FIG. 4 is a flowchart of a method for processing videos according to a fourth embodiment of the present disclosure.

FIG. 4 is a flowchart of a method for processing videos according to a fourth embodiment of the present disclosure. This embodiment is applicable in any situation of detecting the line-of-sight direction of a user in a plurality of video frames in a video. The method for processing videos according to this embodiment may be performed by an apparatus for processing videos according to the embodiment of the present disclosure. The apparatus may be implemented by means of software and/or hardware, and integrated in a device for performing the method. The device may be any three-dimensional model processing device with image processing capabilities.

Referring to FIG. 4, the method may include the following processes.

In S410, a video frame in a to-be-processed video is acquired.

Where the line-of-sight direction of the face in the video frames of the video needs to be detected, the video may be processed at first to extract a plurality of video frames in the to-be-processed video, such that the line-of-sight direction in the video frames can be subsequently detected.

In S420, the line-of-sight direction of the actual face corresponding to the video frame is acquired by performing the method for detecting line-of-sight according to the above embodiments.

In the case that the video frames in the to-be-processed video are acquired, the corresponding line-of-sight directions of the actual face in the plurality of video frames may be acquired by sequentially detecting each of the video frames in the to-be-processed video by the method for detecting line-of-sight according to the above embodiments.

In addition, in order to improve the intelligence of video processing, upon determining the line-of-sight direction of the face in each video frame, a corresponding operation may be directly performed on the to-be-processed video by judging the position of the line-of-sight direction. Therefore, upon acquiring the line-of-sight direction corresponding to the video frame, the method according to this embodiment may further include: determining a corresponding line-of-sight offset based on the line-of-sight direction corresponding to an adjacent video frame in the to-be-processed video; and performing a corresponding video edit operation based on the line-of-sight offset.

During determination of the line-of-sight directions of a plurality of video frames in the to-be-processed video, the corresponding line-of-sight offset may be determined by analyzing the line-of-sight direction corresponding to the adjacent video frame, and then the corresponding video edit operation may be directly performed on the to-be-processed video based on the line-of-sight offset. For example, in the case that the line-of-sight in the video is offset to the left, some special effect maps may be added in the to-be-processed video.

In the technical solution according to this embodiment, the corresponding video edit operation is directly performed by detecting the line-of-sight directions of the video frame in the to-be-processed video and judging the line-of-sight offset to improve the intelligence of video processing.

Fifth Embodiment

Figure 5:
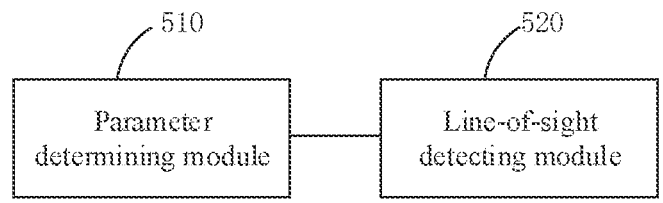
FIG. 5 is a schematic structural diagram of an apparatus for detecting line-of-sight according to a fifth embodiment of the present disclosure.

FIG. 5 is a schematic structural diagram of an apparatus for detecting line-of-sight according to a fifth embodiment of the present disclosure. As shown in FIG. 5, the apparatus may include: a parameter determining module 510, configured to determine, based on a key feature point in a face image, a face posture and an eye pupil rotational displacement corresponding to the face image, wherein the eye pupil rotational displacement is a displacement of a pupil center relative to an eyeball center in the face image; and a line-of-sight detecting module 520, configured to acquire a line-of-sight direction of the actual face by back-projecting, based on a preset projection function and the face posture, the eye pupil rotational displacement to a three-dimensional space where an actual face is located.

In the technical solution according to this embodiment, the face posture corresponding to the face image and the eye pupil rotational displacement of the pupil center relative to the eyeball center in the face image are determined based on the key feature point in the face image, and then the eye pupil rotational displacement is back-projected to the three-dimensional space where the actual face is located based on the preset projection function and the face posture, thereby acquiring the line-of-sight direction of the actual face. In this solution, it is unnecessary to compare the eye texture in the face image with the eye textures in a large number of history face images, or judge a rotational direction of the eyeball based on the movement of other features than the eyeball in the face image, which reduces the processing amount of eye data and improves the detection efficiency of the line-of-sight direction. The line-of-sight direction of the actual face is directly analyzed based on eye pupil rotation in the face image, which improves the detection accuracy of the line-of-sight direction.

The apparatus for detecting line-of-sight may further include: a feature point determining module, configured to: acquire face data corresponding to the face image by scanning the face image; acquire a reconstructed face grid model by reconstructing a preset three-dimensional face grid template with the face data; and extract the key feature point in the reconstructed face grid model, and take the key feature point in the reconstructed face grid model as the key feature point in the face image.

The parameter determining module 510 may include: a posture position determination unit, configured to determine a posture position of the key feature point in the face image; and a face posture determination unit, configured to determine the face posture in the face image based on the posture position.

The parameter determining module 510 may include: an eye center determination unit, configured to determine the eyeball center corresponding to the face image based on the key feature point in the reconstructed face grid model; a pupil center determination unit, configured to acquire the pupil center corresponding to the eye image by recognizing the eye image in the face image; and a pupil displacement determining unit, configured to determine, based on a position of the eyeball center and a position of the pupil center, the eye pupil rotational displacement corresponding to the face image.

The pupil center determination unit may be configured to capture the eye image in the face image; and acquire the pupil center corresponding to the eye image by inputting the eye image into a pre-constructed deep network model.

The apparatus for detecting line-of-sight may further include: an eyeball reconstructing module, configured to construct a corresponding three-dimensional eye model in the reconstructed face grid model based on the line-of-sight direction of the actual face.

The line-of-sight detecting module 520 may include: an optimization function construction unit, configured to construct a corresponding line-of-sight optimization function based on the preset projection function, the face posture, and the eye pupil rotational displacement; and a line-of-sight detection unit, configured to acquire a line-of-sight direction that reaches a preset optimization target in the line-of-sight optimization function in the three-dimensional space where the actual face is located, and take an acquired line-of-sight direction as the line-of-sight direction of the actual face.

The face posture includes a rotation parameter of the face and a translation parameter of the face in the face image.

The line-of-sight detecting module 520 may further include: an associated image acquisition unit, configured to acquire an associated image of the face image, and the associated image carries a line-of-sight direction corresponding to the associated image; and an optimization function updating unit, configured to update the line-of-sight optimization function based on the line-of-sight direction of the associated image, a preset associated smoothing parameter and a preset anti-shake parameter.

The updated line-of-sight optimization function may be: $\min\{\|\Pi(Rx+t)-d\|^2+\alpha\|x-x_0\|^2+\beta\|x\|^2\}$; wherein $\Pi(Rx+t)$ represents the preset projection function, R represents a rotation parameter in the face posture, t represents the translation parameter in the face posture, x represents the line-of-sight direction of the face image, d represents the eye pupil rotational displacement, $x_0$ represents the line-of-sight direction of the associated image, α represents the preset associated smoothing parameter, and β represents the preset anti-shake parameter.

The apparatus for detecting line-of-sight may further include: a projection function determining module, configured to determine the preset projection function based on a parameter of a capture device corresponding to the face image.

The parameter of the capture device is an imaging focal length of the capture device.

The apparatus for detecting line-of-sight according to this embodiment is applicable to the method for detecting line-of-sight according to any one of the above embodiments, and possesses corresponding functions.

Sixth Embodiment

Figure 6:
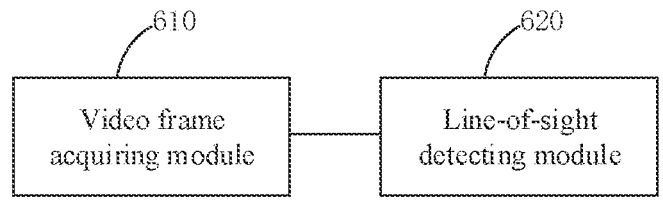
FIG. 6 is a schematic structural diagram of an apparatus for processing videos according to a sixth embodiment of the present disclosure.

FIG. 6 is a schematic structural diagram of an apparatus for processing videos according to a sixth embodiment of the present disclosure. As shown in FIG. 6, the apparatus may include: a video frame acquiring module 610, configured to acquire a video frame in a to-be-processed video; and a line-of-sight detecting module 620, configured to acquire the line-of-sight direction of the actual face corresponding to the video frame by performing the method for detecting line-of-sight according to any of the embodiments of the present disclosure.

In the technical solution according to this embodiment, the corresponding video edit operation is directly performed by detecting the line-of-sight direction of each video frame in the to-be-processed video and judging the line-of-sight offset to improve the smartness of video processing.

The apparatus for processing videos may further include: an operation executing module configured to determine a line-of-sight offset corresponding to an adjacent video frame based on the line-of-sight direction corresponding to the adjacent video frame in the to-be-processed video; and perform the video edit operation corresponding to the adjacent video frame based on the line-of-sight offset.

The apparatus for processing videos according to this embodiment is applicable to the method for processing videos according to any one of the above embodiments, and possesses corresponding functions.

Seventh Embodiment

Figure 7:
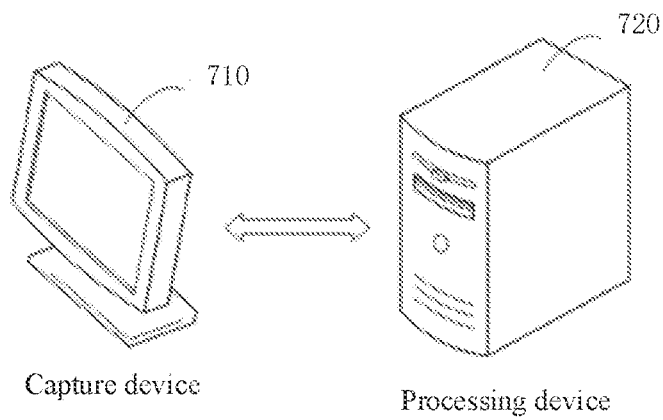
FIG. 7 is a schematic structural diagram of a system for processing line-of-sight according to a seventh embodiment of the present disclosure.

FIG. 7 is a schematic structural diagram of a system for processing line-of-sight according to a seventh embodiment of the present disclosure. Referring to FIG. 7, the system for processing line-of-sight includes: a capture device 710 and a processing device 720 that are communicably connected. The capture device 710 is disposed on the processing device 720.

The capture device 710 captures a to-be-detected face image and a to-be-processed video, and sends the face image and the to-be-processed video to the processing device 720.

The processing device 720 is provided with the apparatus for detecting line-of-sight and the apparatus for processing videos according to the above embodiments, and is applicable to the method for detecting line-of-sight and the method for processing videos according to any of the embodiments of the present disclosure. The execution processes are referred to the method for detecting line-of-sight and the method for processing videos in any of the embodiments of the present disclosure. Corresponding functions are achieved, which are not described here in detail.

Eighth Embodiment

Figure 8:
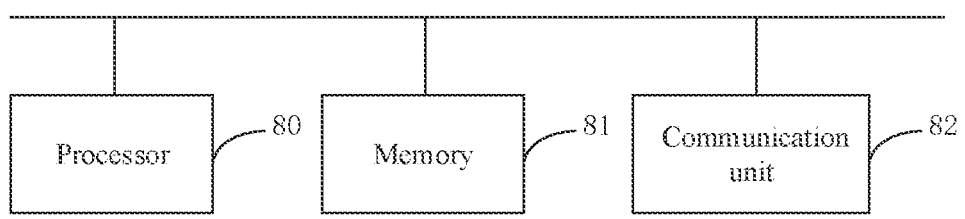
FIG. 8 is a schematic structural diagram of a device according to an eighth embodiment of the present disclosure.

FIG. 8 is a schematic structural diagram of a device according to an eighth embodiment of the present disclosure. As shown in FIG. 8, the device includes a processor 80, a memory 81, and a communication module 82. The number of the processors 80 in the device may be one or more, and one processor 80 is taken as an example in FIG. 8. The processor 80, the memory 81, and the communication unit 82 in the device may be connected by a bus or in other means. In FIG. 8, the connection by a bus is taken as an example.

As a computer-readable storage medium, the memory 81 may be configured to store software programs, computer-executable programs, and modules, such as the program instructions/modules corresponding to the method for detecting line-of-sight, or the method for processing videos according to any of the embodiments of the present disclosure. The processor 80 executes various functional applications and data processing of the device by running the software programs, instructions, and modules stored in the memory 81. That is, the method for detecting line-of-sight, or the method for processing videos is performed.

The memory 81 may mainly include a storage program area and a storage data area. The storage program area may store an operating system and an application program required by at least one function; the storage data area may store data created based on the use of a terminal, etc. In addition, the memory 81 may include a high-speed random-access memory, and may further include a non-volatile memory, such as at least one magnetic disk storage device, a flash memory device, or other non-volatile solid-state storage devices. In some examples, the memory 81 may include memories remotely disposed relative to the processor 80, and these remote memories may be connected to the device via a network. Examples of the network include, but are not limited to, the Internet, a corporate intranet, a local area network, a mobile communication network, and combinations thereof.

The communication unit 82 may be configured to implement network connection or mobile data connection among devices.

The device according to this embodiment may be configured to perform the method for detecting line-of-sight or the method for processing videos according to any one of the above embodiments, and implement corresponding functions.

Ninth Embodiment

A ninth embodiment of the present disclosure further provides a computer-readable storage medium storing a computer program. The computer program, when run by a processor, causes the program to perform the method for detecting line-of-sight, or the method for processing videos in any one of the above embodiments.

The method for detecting line-of-sight may include:

determining, based on a key feature point in a face image, a face posture and an eye pupil rotational displacement corresponding to the face image, wherein the eye pupil rotational displacement is a displacement of a pupil center relative to an eyeball center in the face image; and acquiring a line-of-sight direction of the actual face by back-projecting, based on a preset projection function and the face posture, the eye pupil rotational displacement to a three-dimensional space where an actual face is located.

The method for processing videos may include:

acquiring a video frame in a to-be-processed video; and acquiring the line-of-sight direction of the actual face corresponding to the video frame by performing the method for detecting line-of-sight according to any one of the embodiments of the present disclosure.

For a storage medium including computer-executable instructions according to the embodiment of the present disclosure, the computer-executable instructions are not limited to the method operations as described above, and may further perform related operations in the method for detecting line-of-sight, or the method for processing videos according to any one of the embodiments of the present disclosure.

Based on the description of the implementations, those skilled in the art may understand that the present disclosure may be implemented via software and general-purpose hardware, and may further be implemented by hardware. Based on this, the technical solutions of the present disclosure may be embodied in the form of a software product, and the computer software product may be stored in a computer-readable storage medium, such as a computer floppy disk, a read-only memory (ROM), a random-access memory (RAM), a flash, a hard disk or an optical disk, including a plurality of instructions to cause a computer device (may be a personal computer, a server, or a network device, or the like) to perform the methods according to various embodiments of the present disclosure.

In the embodiments of the apparatus for detecting line-of-sight or the apparatus for processing videos, the plurality of units and modules are only divided according to the functional logic, but are not limited to the above division, as long as the corresponding functions can be achieved; in addition, the names of a plurality of functional units are only for the convenience of distinguishing each other, and are not intended to limit the scope of protection of the present disclosure.

What is claimed is:

1. A method for detecting line-of-sight, comprising:

determining, based on a key feature point in a face image, a face posture and an eye pupil rotational displacement corresponding to the face image, wherein the eye pupil rotational displacement is a displacement of a pupil center relative to an eyeball center in the face image; and acquiring a line-of-sight direction of an actual face by back-projecting, based on a preset projection function and the face posture, the eye pupil rotational displacement to a three-dimensional space where the actual face is located, wherein acquiring the line-of-sight direction of the actual face by back-projecting, based on the preset projection function and the face posture, the eye pupil rotational displacement to the three-dimensional space where the actual face is located comprises:

constructing a corresponding line-of-sight optimization function based on the preset projection function, the face posture, and the eye pupil rotational displacement; and acquiring a line-of-sight direction that reaches a preset optimization target in the line-of-sight optimization function in the three-dimensional space where the actual face is located, and taking the acquired line-of-sight direction as the line-of-sight direction of the actual face.

2. The method according to claim 1, wherein prior to determining, based on the key feature point in the face image, the face posture and the eye pupil rotational displacement corresponding to the face image, the method further comprises:

acquiring face data corresponding to the face image by scanning the face image;

acquiring a reconstructed face grid model by reconstructing a preset three-dimensional face grid template with the face data; and extracting the key feature point in the reconstructed face grid model, and taking the key feature point in the reconstructed face grid model as the key feature point in the face image.

3. The method according to claim 2, wherein determining, based on the key feature point in the face image, the face posture corresponding to the face image comprises:

determining a posture position of the key feature point in the face image; and determining the face posture in the face image based on the posture position.

4. The method according to claim 2, wherein determining, based on the key feature point in the face image, the eye pupil rotational displacement corresponding to the face image comprises:

determining, based on the key feature point in the reconstructed face grid model, the eyeball center corresponding to the face image;

acquiring the pupil center corresponding to the eye image by recognizing an eye image in the face image; and determining, based on a position of the eyeball center and a position of the pupil center, the eye pupil rotational displacement corresponding to the face image.

5. The method according to claim 4, wherein acquiring the pupil center corresponding to the eye image by recognizing the eye image in the face image comprises:

capturing the eye image in the face image; and acquiring the pupil center corresponding to the eye image by inputting the eye image into a pre-constructed deep network model.

6. The method according to claim 2, wherein upon acquiring the line-of-sight direction of the actual face by back-projecting, based on the preset projection function and the face posture, the eye pupil rotational displacement to the three-dimensional space where the actual face is located, the method further comprises:

constructing a corresponding three-dimensional eye model in the reconstructed face grid model based on the line-of-sight direction of the actual face.

7. The method according to claim 1, wherein the face posture comprises a rotation parameter and a translation parameter of the face in the face image.

8. The method according to claim 1, wherein prior to acquiring the line-of-sight direction that reaches the preset optimization target in the line-of-sight optimization function in the three-dimensional space where the actual face is located, and taking the acquired line-of-sight direction as the line-of-sight direction of the actual face, the method further comprises:

acquiring an associated image of the face image, wherein the associated image carries the line-of-sight direction corresponding to the associated image; and updating the line-of-sight optimization function based on the line-of-sight direction of the associated image, a preset associated smoothing parameter, and a preset anti-shake parameter.

9. The method according to claim 8, wherein the updated line-of-sight optimization function is: $\min\{\|\Pi(Rx+t)-d\|^2 + \alpha\|x-x_0\|^2 + \beta\|x\|^2\}$;

wherein $\Pi(Rx+t)$ represents the preset projection function, R represents the rotation parameter in the face posture, t represents the translation parameter in the face posture, x represents the line-of-sight direction of the face image, d represents the eye pupil rotational displacement, $x_0$ represents the line-of-sight direction of the associated image, $\alpha$ represents the preset associated smoothing parameter, and $\beta$ represents the preset anti-shake parameter.

10. The method according to claim 1, wherein prior to acquiring the line-of-sight direction of the actual face by back-projecting, based on the preset projection function and the face posture, the eye pupil rotational displacement to the three-dimensional space where the actual face is located, the method further comprises:

determining the preset projection function based on a parameter of a capture device corresponding to the face image.

11. The method according to claim 10, wherein the parameter of the capture device is an imaging focal length of the capture device.

12. A method for processing videos, comprising:
acquiring a video frame in a to-be-processed video; and
acquiring the line-of-sight direction of the actual face corresponding to the video frame by performing the method for detecting line-of-sight as defined in claim 1.

13. The method according to claim 12, wherein upon acquiring the line-of-sight direction corresponding to the video frame, the method further comprises:

determining, based on the line-of-sight direction corresponding to an adjacent video frame in the to-be-processed video, a line-of-sight offset corresponding to the adjacent video frame; and performing, based on the line-of-sight offset, a video edit operation corresponding to the line-of-sight offset.

14. A device for detecting line-of-sight, comprising:
at least one processor; and
a memory configured to store at least one program; wherein
the at least one program, when run by the at least one processor, causes the at least one processor to perform the method for detecting line-of-sight as defined in claim 1.

15. A non-transitory computer-readable storage medium storing a computer program, wherein the computer program, when run by a processor, causes the processor to perform the method for detecting line-of-sight as defined in claim 1.

16. A non-transitory computer-readable storage medium storing a computer program, wherein the computer program, when run by a processor, causes the processor to perform the method for processing videos as defined in claim 12.

17. A device for processing videos, comprising:
at least one processor; and
a memory configured to store at least one program; wherein the at least one program, when run by the at least one processor, causes the at least one processor to perform the method for processing videos as defined in claim 12.

* * * * *